Oct. 29, 1968  B. R. WANLASS  3,408,463

DOUBLE POLE, DOUBLE THROW SWITCH ASSEMBLY

Filed March 13, 1967

INVENTOR.
Bert R. Wanlass
Donald P. Selnecki
ATTORNEY

United States Patent Office 3,408,463
Patented Oct. 29, 1968

3,408,463
DOUBLE POLE, DOUBLE THROW
SWITCH ASSEMBLY
Bert R. Wanlass, Warren, Mich., assignor to General
Motors Corporation, Detroit, Mich., a corporation
of Delaware
Filed Mar. 13, 1967, Ser. No. 622,757
3 Claims. (Cl. 200—6)

ABSTRACT OF THE DISCLOSURE

In a preferred form, the electric switch set forth herein is a double-pole double-throw switch adapted for use in circuits allowing the reversing of rotation of a permanent magnet motor. The reversal of rotation of permanent magnet motors requires that the polarity be switched from one lead to the armature to the opposite lead as well as a shifting of the ground path.

---

This invention relates to electric switches and more particularly to an electric switch adapted to act as a double-pole double-throw switch automatically returning to a neutral position upon release of the actuator.

Permanent magnet motors of common design are conventional insofar as an armature and commutator is concerned but have, for example, ferrite pole pieces without any electrical leads thereto. Normally, an electric motor can be reversed by reversing the voltage to the field coils or the armature. In permanent magnet motors, it requires that not only the voltage be reversed to the opposite ends of the armature leads but also that the polarity remain the same at the opposite armature lead. Consequently, intricate switching mechanism is required to carry this out.

It is an object of the present invention to provide an improved electric switch adapted for use in reversing the direction of rotation of a permanent magnet motor.

It is another object of the present invention to provide an improved electric switch very simple in construction and adapted to carry out the complex function of changing the direction of rotation of a permanent magnet motor armature.

It is still another object of the present invention to provide an improved electric switch which is suited for operation in the environment of a motor vehicle in which the windows thereof are driven up and down by a reversing permanent magnet motor.

It is a further object of the present invention to provide an improved electric switch which has an insertable relatively fixed contact board which can change the sequence or type of switching function carried out without altering the design of the basic switch.

Further objects and advantages of the present invention will be apparent from the following description, reference being had to the accompanying drawings wherein a preferred embodiment of the present invention is clearly shown.

Figure 1:
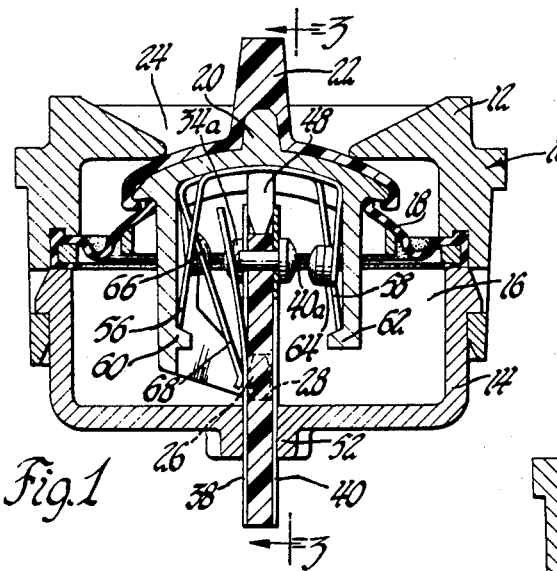
FIGURE 1 is a sectional view of the subject invention shown in the neutral position.

Referring to FIGURE 1, a switch body, generally designated by the numeral 10, has an upper portion 12 and a lower portion 14 that resiliently snap together to form the composite switch housing. A compartment 16 is formed therein which is separated into two portions by flexible web seal 18. Seal 18 is trapped between the upper portion 12 and lower portion 14 during assembly and resiliently engages a periphery of actuator body 20 to completely enclose the area of compartment 16 in which the switching takes place and maintains said area substantially free of moisture and foreign material.

Actuator cover 22 is composed of any decorative low friction material and snaps around actuator body 20 substantially covering the portion of actuator 20 exposed to opening 24 of switch body 10. Actuator body 20 is better seen in the perspective view in FIGURE 4 and therein it is seen that pivot leg 26 is integrally formed therewith and engages slot 28 in fixed contact means 30.

Fixed contact means 30 is generally composed of a substantially rigid member 32 to which are attached conductive strips 34, 36, 38, 40, 42 and 44. In the form shown, the conductive strips are bonded to rigid member 32 near the bottom and approximately to the point where slot 28 is situated. Above this point, the resilient strips are free to move away from rigid member 32 in order to carry out the function of the subject switch. Strip 34 is normally maintained by its own resiliency substantially parallel and contiguous to rigid member 32. Strip 34 would be typically attached to one end of the armature winding of a permanent magnet motor. Strip 36 is similar to strip 34 in its operative position and is typically connected to the B+ lead of a battery or power source. Strip 38 is also a resilient strip similar to strips 34 and 36 but has an upper end 38a that is statically bent back away from rigid member 32. Strip 38 would be typically connected to ground. Strip 40 is normally disposed flat against rigid member 32 and has mounted thereon contact 40a with a pin extension 40b extending through aperture 40c to contact bent back portion 38a of strip 38. Strip 40 would typically be attached to the opposite end of an armature of the permanent magnet motor from which strip 34 is attached. Strip 42 is a strip similar to strip 36 and is mounted against rigid member 32 in the same fashion as strip 36. Strip 42, however, is a dummy that is not electrically interconnected to the subject switch but merely aids in the centering of actuator body 20. Strip 44 corresponds in its mounting to strip 38 and is contacted by a pin connected to contact 34a in much the same manner as strip 38 is contacted by pin 40b.

Figure 4:
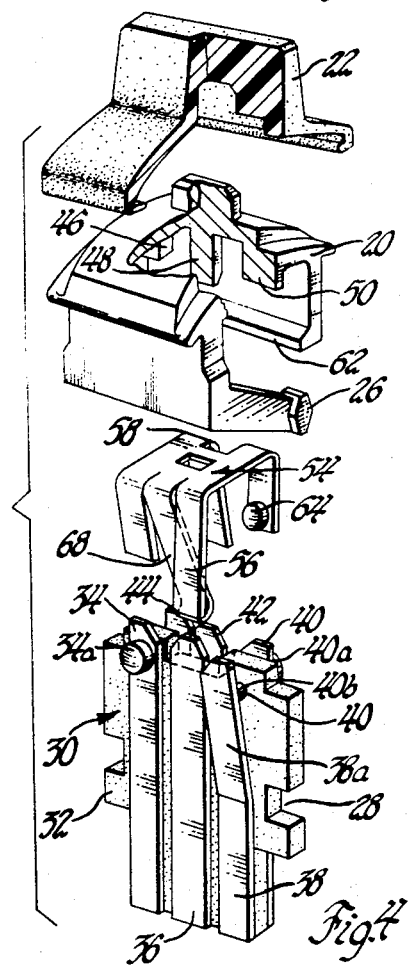
FIGURE 4 is an exploded perspective view with parts broken away of the actuator and contacting mechanism in the subject switch.
Figure 3:
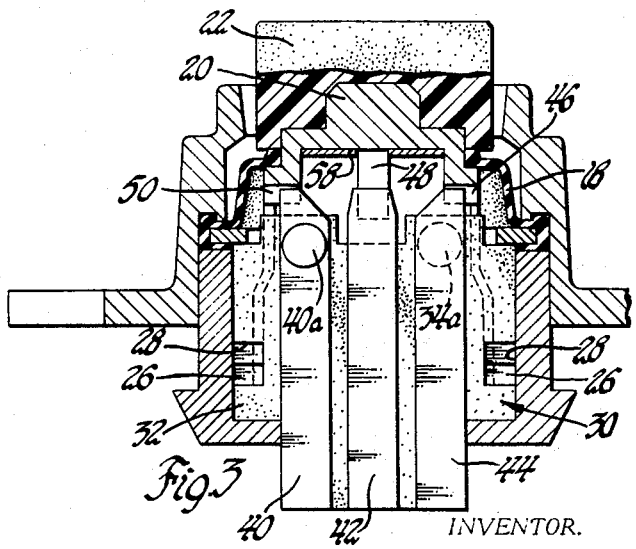
FIGURE 3 is a sectional view taken along line 3—3 of FIGURE 1.

Referring to actuator body 20, as seen in the perspective of FIGURE 4, pins 46, 48 and 50 project downwardly away from actuator cover 22 and are positioned between strips 34 and 44, 36 and 42, and 38 and 40, respectively. These pins are substantially the same width as rigid member 32 and normally maintain actuator body 20 centered with respect to opening 24 and opening 52 in lower switch body 14 through which fixed contact means 30 is disposed. Fixed contact means 30 is operatively held in position by frictional engagement between conductive strips 34 to 44 with the walls of aperture 52 and by interlocking with pivot leg 26 at slot 28.

Referring to FIGURE 4, movable contact means 54 is resiliently carried in an interior portion of actuator body 20 by means of the resilient engagement of legs 56 and 58 with the interior surface of actuator body 20. Lugs 60 and 62, as viewed in FIGURE 1, prevent the accidental disengagement of contact means 54 from its mounted position in actuator body 20.

Referring to FIGURE 1, movable contact 64 is normally situated a spaced distance from contact 40a and contact 66 is normally positioned a spaced distance from contact 34a. Resilient leg 68 constantly engages resilient strip 36.

Figure 2:
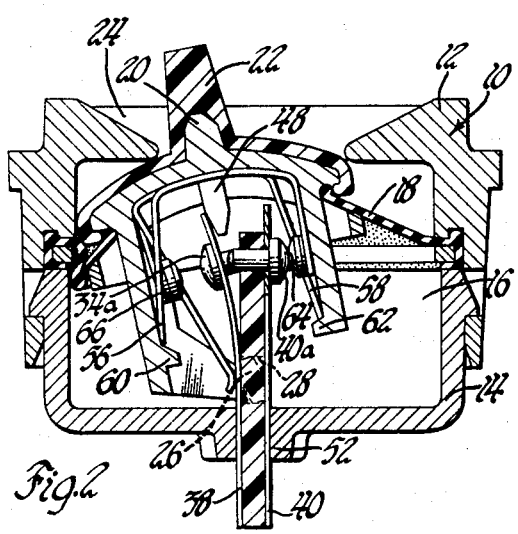
FIGURE 2 is a sectional view similar to FIGURE 1 showing the switch in an actuated position.

In operation, referring to FIGURE 1, the switch is illustrated in the neutral position in which actuator cover 22 is centered in opening 24 and wherein no circuits are energized. If it is desired to operate the permanent magnet motor to which the subject switch is electrically engaged, a pivoting movement of actuator cover 22 is effected so that it assumes the position substantially seen in FIGURE 2. While in this position, lug 46 has pushed conductive strip 34 out of conductive relationship with strip 44, thus interrupting a path for current flow between ground strip 44 and motor strip 34. Simultaneously therewith, lug 50 moves out toward portion 38a of strip 38 and contact 64 engages contact 40a. In this manner, an electric circuit is set up from B+ strip 36 through contact 64 to both motor strip 40 and ground strip 38. This results in the rotation of the armature of a permanent magnet motor in a given direction. Releasing pressure from actuator cover 22 results in a centering of actuator body 20 and a return of the switch parts to the configuration shown in FIGURE 1 which is a neutral position.

A reverse pivoting of the actuator cover 22 will bring about the opposite direction of rotation of the armature but it should be noted that, in order to maintain the polarity on the armature the same as for the opposite direction of rotation but on the reverse motor lead, the ground through strip 38 is destroyed while the ground through strip 44 is maintained. In this manner, the polarity to the motor remains the same but the input is to the opposite armature lead. Therefore, a rather complex switching has taken place by use of only a single actuator with the proper ground automatically selected and reversing of the motor effected.

The switch shown is particularly adapted for use in controlling the permanent magnet window regulator motor which is directly geared to the window raising and lowering mechanism. The switch eliminates the need for solenoid operating gear changes which might be necessary if the motor were only operable in a single direction of rotation. The cost savings of this arrangement are obvious.

While the embodiment of the present invention, as herein disclosed, constitutes a preferred form, it is to be understood that other forms might be adopted.

What is claimed is:

1. A double pole, double throw switch assembly for controlling energization and de-energization of first and second electric circuit means comprising: a switch housing having an opening therein; a member supported by said housing and extending interiorly thereof and terminating in an end portion; a plurality of opposed pairs of resilient blades affixed to opposite sides of said member and having free ends projecting beyond the end portion of said member; a manually manipulatable actuator means pivotally supported for movement relative to said housing in opposite directions from a center position, said actuator means having depending portions positioned between at least some of the opposed pairs of blades and with said resilient blades biasing said actuator means toward its center position; and movable contact means carried by said actuator means, said movable contact means including a first contact portion constantly engageable with one of said resilient blades and second and third contact portions positioned so as to engage certain ones of said resilient blades when said actuator means is pivoted in first and second directions from its centered position to effect energization of the first and second electric circuit means, respectively.

2. In a vehicle, an electric switch for reversing the direction of rotation of a permanent magnet motor arranged to raise and lower vehicle windows, said switch comprising: a switch housing positioned in a vehicle driving compartment near a vehicle window where said switch is manipulatable by a vehicle operator, said housing having a first opening facing the driving compartment of the vehicle and a second opening facing in an opposite direction; fixed contact means slidable through said second opening and including opposed resilient blades operatively positioned within said switch housing; actuator means pivotally supported by said fixed contact means and having centered projections disposed between said opposed resilient blades and with the resilient blades being operable to return said actuator means to a neutral centered position after a pivotal movement thereof from the neutral centered position; and resilient movable contacts carried by said actuator means and being operatively positioned by said centered projections, said movable contacts including at least one flexible blade constantly engaging at least one of said opposed resilient blades, other of said flexible contacts selectively engaging said opposed resilient blades while other opposed resilient blades are disengaged from each other to select the polarity of voltage to the armature of the permanent magnet motor causing rotation in a desired direction.

3. An electric switch for controlling the direction of rotation of a permanent magnet motor, said switch comprising: a switch housing having an interiorly formed compartment and ingress into said compartment through opposed openings in walls of said switch housing; a substantially rigid member slidable through a first of said openings and having a plurality of conductive strips affixed to opposite sides thereof, said conductive strips being resilient and having portions extending beyond the margins of said rigid member; actuator means pivotally supported by said rigid member and including centrally disposed lugs situated between said portions of said conductive strips extending beyond said rigid member, said conductor strips being operable to return said actuator means to a centered position relative to a second of said openings in said switch housing after a pivoting movement thereof; and a resilient conductive member carried by said actuator means and straddling said conductive strip extending portions carried by said rigid member, at least one portion of said conductive member constantly engaging one of said conductive strips being electrically connected to ground and a second group of conductive strips electrically connected to opposite ends of the armature winding of the permanent magnet motor, said actuator means being pivotable in either of two directions from a neutral position to selectively place voltage of a desired polarity on an end of the armature winding to gain a desired direction of rotation thereof by breaking a ground which would induce voltage to rotate the armature in an undesired direction and contemporaneously making a ground which induces voltage to rotate the armature in a desired direction.

References Cited

UNITED STATES PATENTS

| 2,678,974 | 5/1954 | Mason | 200—6 |
|---|---|---|---|
| 3,033,946 | 5/1962 | Meyer et al. | 200—6 |
| 3,335,240 | 8/1967 | Dhaens et al. | 200—6 X |

ROBERT K. SCHAEFER, *Primary Examiner.*

H. BURKS, *Assistant Examiner.*